(12) United States Patent
Jones et al.

(10) Patent No.: US 9,643,522 B2
(45) Date of Patent: May 9, 2017

(54) ORTHOPEDIC CUSHION FOR A SEAT

(71) Applicant: Pedigree Systems, Inc., Sevierville, TN (US)

(72) Inventors: Jeffrey L. Jones, Sevierville, TN (US); Mark V. Jackson, Sevierville, TN (US); Robert Baker, Dandridge, TN (US)

(73) Assignee: Pedigree Systems, Inc., Sevierville, TN (US)

( * ) Notice: Subject to any disclaimer, the term of this patent is extended or adjusted under 35 U.S.C. 154(b) by 304 days.

(21) Appl. No.: 14/520,787

(22) Filed: Oct. 22, 2014

(65) Prior Publication Data

US 2015/0108799 A1    Apr. 23, 2015

Related U.S. Application Data

(60) Provisional application No. 61/894,686, filed on Oct. 23, 2013.

(51) Int. Cl.
| | | |
|---|---|---|
| *B60N 2/58* | (2006.01) | |
| *B60N 2/60* | (2006.01) | |
| *B60N 2/70* | (2006.01) | |

(52) U.S. Cl.
CPC ......... *B60N 2/5825* (2013.01); *B60N 2/6027* (2013.01); *B60N 2/7005* (2013.01)

(58) Field of Classification Search
None
See application file for complete search history.

(56) References Cited

U.S. PATENT DOCUMENTS

| | | | | |
|---|---|---|---|---|
| 4,132,228 A | * | 1/1979 | Green ................ | A47C 7/022 297/284.3 |
| 4,313,640 A | | 2/1982 | Trotman et al. | |
| 4,435,015 A | | 3/1984 | Trotman et al. | |
| 4,524,762 A | * | 6/1985 | Schulman ........... | A61G 7/0573 297/284.1 |
| 4,698,864 A | * | 10/1987 | Graebe ............... | A47C 27/081 297/DIG. 3 |
| 4,836,605 A | * | 6/1989 | Greenwood ........ | A47C 7/021 297/250.1 |
| 4,860,397 A | * | 8/1989 | Gusakov ............. | A47C 27/081 297/DIG. 3 |
| 4,965,899 A | * | 10/1990 | Sekido ................ | B60N 2/665 297/284.11 |
| 5,044,030 A | * | 9/1991 | Balaton .............. | A47C 27/081 297/DIG. 3 |

(Continued)

*Primary Examiner* — David E Allred
(74) *Attorney, Agent, or Firm* — Pitts & Lake, P.C.

(57) ABSTRACT

An orthopedic seat cushion for placement on a seat for supporting the weight of an occupant includes an envelope comprising an upper sheet and a lower sheet sealed together to define an interior volume. The interior volume is subdivided into a plurality of depressible cells wherein adjacent cells are in fluid communication with one another. The envelope has an opening penetrated through the upper sheet and lower sheet, wherein the opening has a front end and a back end and is configured to allow clearance for a sensitive area of the occupant. At least one cell has a height dimension that inhibits the sensitive area from contacting the seat when the at least one cell is depressed by the weight of the occupant.

20 Claims, 6 Drawing Sheets

(56) References Cited

U.S. PATENT DOCUMENTS

| | | | |
|---|---|---|---|
| 5,113,540 A * | 5/1992 | Sereboff | A47C 7/021 297/452.41 |
| 5,243,722 A * | 9/1993 | Gusakov | A47C 7/021 297/DIG. 3 |
| 5,333,921 A * | 8/1994 | Dinsmoor, III | A61G 5/1043 297/219.1 |
| 5,403,065 A | 4/1995 | Callerio | |
| 5,411,318 A | 5/1995 | Law | |
| 5,419,612 A * | 5/1995 | Rassekhi | B62J 1/26 297/200 |
| 5,580,128 A | 12/1996 | Johnson et al. | |
| 5,678,266 A * | 10/1997 | Petringa | A47C 7/021 297/219.1 |
| D409,935 S | 5/1999 | Speckhart | |
| 5,975,568 A | 11/1999 | Speckhart et al. | |
| 6,241,320 B1 | 6/2001 | Chew et al. | |
| 6,598,251 B2 * | 7/2003 | Habboub | B60N 2/242 297/452.42 |
| 6,626,497 B2 | 9/2003 | Nagamitsu et al. | |
| 6,629,724 B2 | 10/2003 | Ekern et al. | |
| 6,644,751 B2 | 11/2003 | Ratza et al. | |
| 6,677,026 B1 | 1/2004 | Yates | |
| 6,733,083 B1 | 5/2004 | Landvik et al. | |
| 6,758,528 B2 | 7/2004 | Kawashima | |
| 6,840,576 B2 | 1/2005 | Ekern et al. | |
| 6,901,617 B2 | 6/2005 | Sprouse, II et al. | |
| 7,059,678 B1 | 6/2006 | Taylor | |
| 7,360,836 B2 | 4/2008 | Schwarzbich et al. | |
| 7,370,911 B2 | 5/2008 | Bajic et al. | |
| 7,775,602 B2 | 8/2010 | Lazanja et al. | |
| 8,671,887 B2 | 3/2014 | Baker et al. | |
| 8,944,066 B1 * | 2/2015 | Kamau | A61G 13/123 128/845 |

* cited by examiner

ORTHOPEDIC CUSHION FOR A SEAT

CROSS-REFERENCE TO RELATED APPLICATIONS

The present application claims priority to Provisional Patent Application No. 61/894,686 filed on Oct. 23, 2013.

STATEMENT REGARDING FEDERALLY SPONSORED RESEARCH OR DEVELOPMENT

Not Applicable

BACKGROUND OF THE INVENTION

1. Field of Invention

The present application relates to a seat cushion, and in particular, to an orthopedic seat cushion for a chair that inhibits pressure from being exerted on portions of an occupant's posterior.

2. Background

For many years the transportation industry has been concerned with discomforts experienced by occupants sitting in automotive vehicle seats for extended periods of time. Some of these discomforts include excessive sweating due to lack of ventilation or pains from local pressure on the occupant's posterior created by prolonged sitting. Likewise, the medical industry has been concerned with discomforts experienced by patients sitting and/or laying in various types of medical furniture, such as for example chairs, beds, wheelchairs, and the like, for extended periods of time.

These industries have each responded with a number of innovations, such as portable seat assemblies, seat inserts, and seat cushions, which provide cushioning, lumbar support, ventilation or combination thereof. However, occupants who suffer from pain in a particular, sensitive area, such as hemorrhoids, have had difficulty finding a seat cushion that inhibits pressure on the sensitive area and still provides orthopedic relief to the rest of the occupant's posterior. Furthermore, seat cushions designed to provide orthopedic relief to occupants tend to lack ventilation. Thus, a seat cushion that provides orthopedic relief but inhibits bodyweight pressure from being exerted on certain sensitive areas of the occupant, while still providing ventilation is desired.

BRIEF SUMMARY

The present general inventive concept, in various example embodiments, includes an orthopedic seat cushion for a seat or chair. Example embodiments of the present general inventive concept can be achieved by providing a seat cushion with an envelope comprising an upper and lower sheet sealed together to define an interior volume. The interior volume can be subdivided into a plurality of cells in fluid communication with each other to allow passage of air or other suitable fluid between contiguous cells. The seat cushion can define an opening penetrated through the sealed upper and lower sheet, oriented near the center of the envelope. The opening of the envelope can be shaped to allow clearance for a portion of an occupant's posterior. The opening of the envelope can further provide ventilation to the occupant, as well. The cells of the envelope can have a height dimension selected to inhibit portions of the occupant's posterior from contacting the seat.

Additional features and embodiments will be set forth in part in the description which follows, and, in part, will be obvious from the description, or may be learned by practice.

BRIEF DESCRIPTION OF THE FIGURES

The following example embodiments are representative of example techniques and structures and not limited to these example embodiments. The above-mentioned features will become more clearly understood from the following detailed description read together with the drawings in which.

DETAILED DESCRIPTION OF THE INVENTION

Figure 1A:
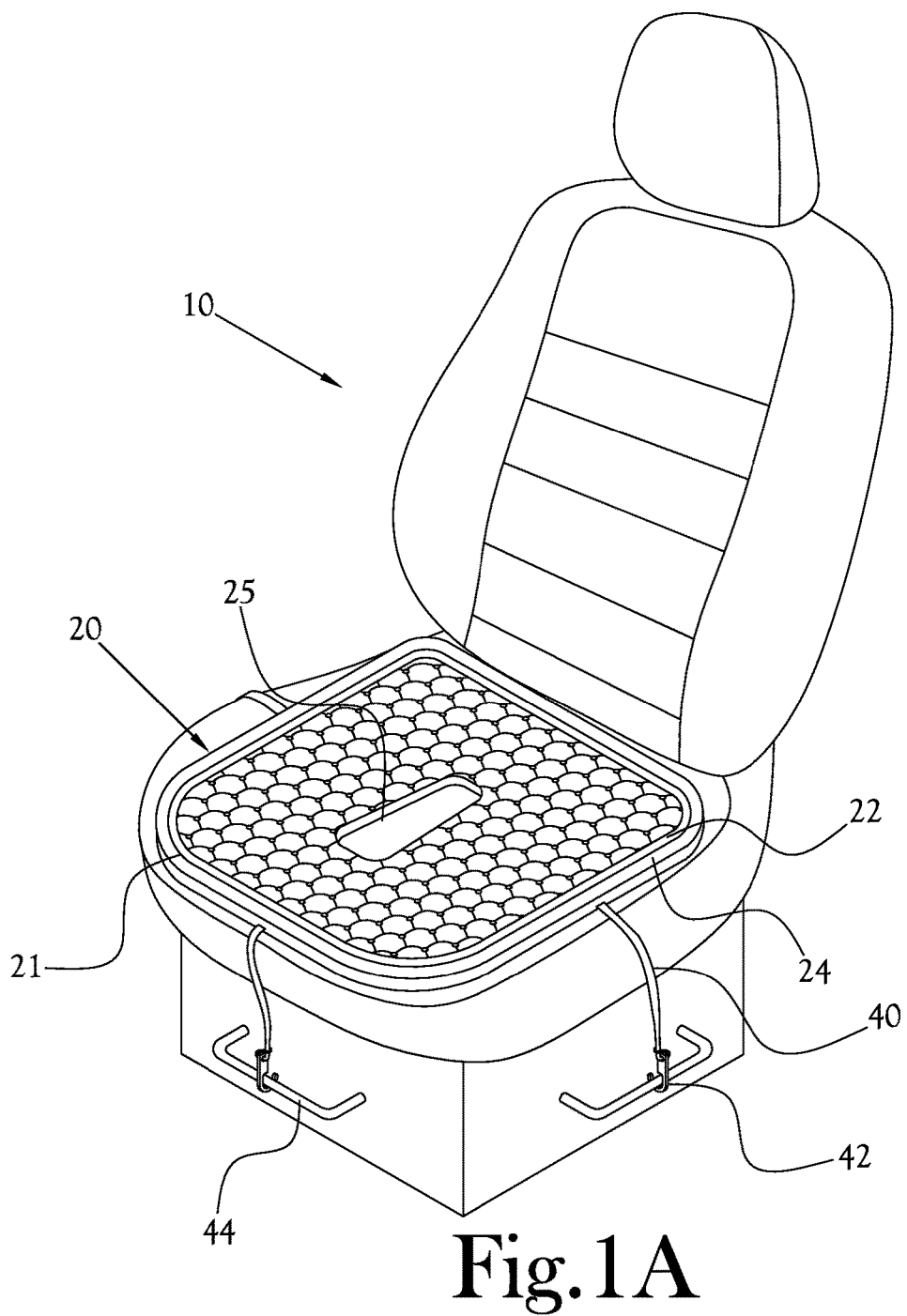
FIGS. 1A-B illustrate an example seat cushion.

Reference will now be made to various example embodiments which are illustrated in the accompanying drawings and illustrations.

The following detailed description is provided to assist the reader in gaining a comprehensive understanding of the example structures and fabrication techniques described herein. Accordingly, various changes, modifications, and equivalents of the structures and fabrication techniques described herein will be suggested to those of ordinary skill in the art. The progression of fabrication operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

Various example embodiments of the present general inventive concept provide a seat cushion configured to be placed on the top surface of a seat or chair. In the example embodiments, the cushion is generally defined by an envelope comprising an upper sheet and a lower sheet, sealed together at the perimeter of each sheet, forming an interior volume. The interior volume can be further subdivided into a plurality of cells, with adjacent cells being in fluid communication with one another. The subdivision of the interior volume into cells may be achieved by coupling the two sheets together at predetermined points through a number of different techniques, such as spot welding, applying adhesive agent, or the like. The cells of the envelope may be filled with air, gel, fluid, or any combination thereof. In certain embodiments, the cells of the envelope may be filled with a silicon and/or glycerin solution. However, other fluid may fill the cells of the envelope.

When bodyweight of the occupant is exerted on the seat cushion, cells of the envelope compress and force fluid into adjacent cells, displacing the volume of fluid in the envelope. The volume displacement of fluid increases pressure within the envelope, allowing each cell to apply gentle force against the occupant's bodyweight. As a result, the pressure of body weight exerted on the cushion is distributed uniformly along the upper surface of the envelope, allowing no cell to be completely depressed. Thus, by uniformly distributing the pressure of bodyweight, the cushion reduces stress on the occupant, ultimately providing more comfort to the occupant for extended periods of time.

In the various example embodiments, the envelope defines an opening penetrated through the sealed upper and lower sheet, oriented near the center of envelope. The opening is shaped to allow clearance for a sensitive area of the occupant's posterior. The sensitive area may include, but is not limited to the occupant's' external genitalia, perineum, pubic area, vulva, anus, internal genitalia, pelvis, coccyx, etc. (hereinafter "sensitive area"). However, the dimension of the opening is constrained to avoid the occupant from lapsing into the entrance of the opening. Thus, the dimension and shape of the opening is configured so that the cushion still provides sufficient support to occupant's buttocks while avoiding contact with occupant's sensitive area. In one example embodiment, the shape of the opening allows the cushion to avoid contact with the anus of an occupant suffering from hemorrhoids. However, the present general inventive concept is not limited to any particular shape for the opening of the envelope. Furthermore, the opening of the envelope provides ventilation to the occupant.

For the various example embodiments, a cell height dimension is selected which gives the cushion a thickness that inhibits the occupant's sensitive area from contacting the seat. Once the occupant sits on the cushion, the cells of the envelope compress, reducing the thickness of the cushion. If the thickness of the cushion reduces too much, the occupant's sensitive area may contact the seat area, adding discomfort to the occupant. Therefore, the cell dimension is selected so that when the occupant's bodyweight depresses the height of the cells, the cushion still maintains a thickness that inhibits the occupant's sensitive area from contacting seat. In one example embodiment, the height of each cell is 0.75 inches, providing the cushion a thickness so that the occupant's sensitive area avoids contact with the seat. However, the present general inventive concept is not limited to any particular cell dimension.

Thus, the combination of the envelope's opening and fluid-filled cells enables the cushion to provide adequate support to the occupant's posterior while inhibiting stress applied to the occupant's sensitive area. As a result, an occupant suffering from hemorrhoids or any other similar pain may sit for an extended period of time with minimal discomfort.

Figure 1B:
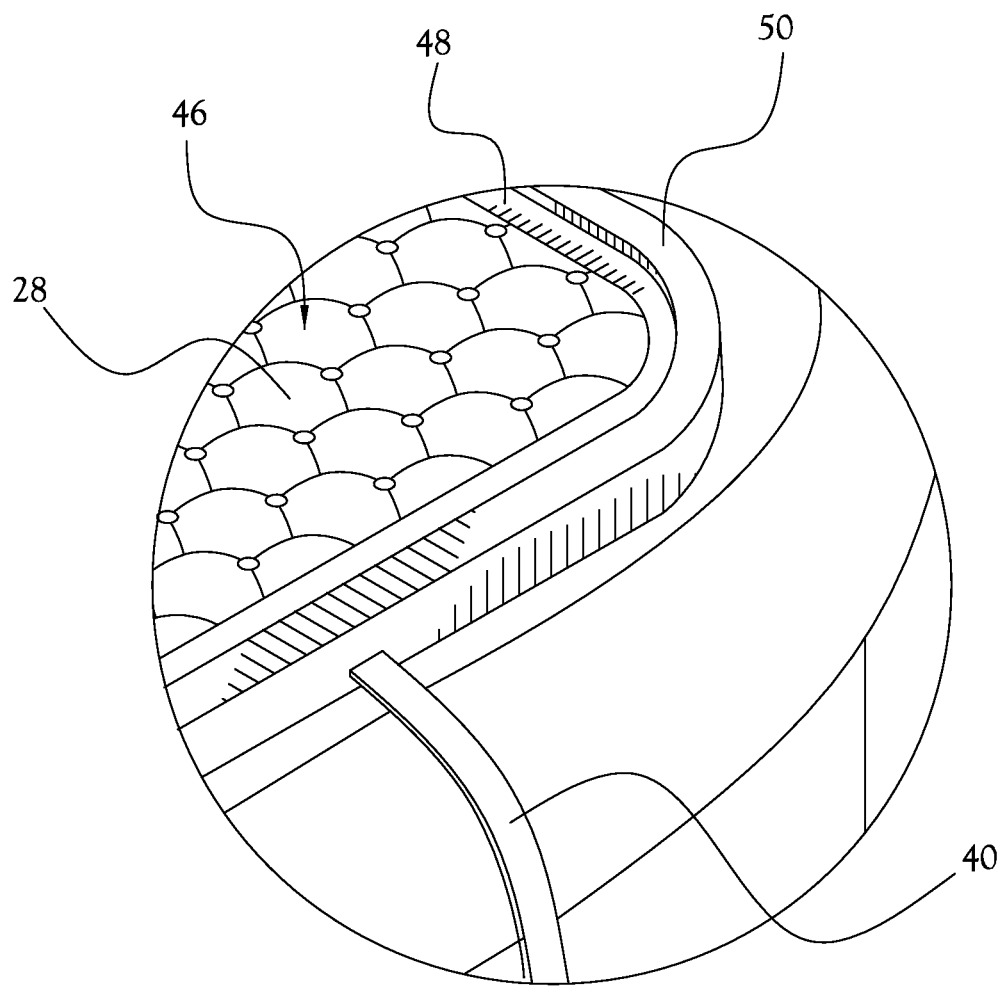

FIGS. 1A-B illustrates a seat 10 incorporating an example embodiment of a seat cushion 20 according to the present general inventive concept. The seat cushion 20 includes an envelope 21 comprising a sealed upper sheet 22 and lower sheet 24. The envelope 21 also defines an opening 25 penetrated through the sealed upper sheet 22 and lower sheet 24, oriented near the center of the envelope 21. As illustrated in FIG. 1, the envelope 21 is sealed along the perimeter of each sheet and along the periphery of the opening 25. In other embodiments, the upper sheet 22 and lower sheet 24 are perimetrically sealed directly to each other.

An example seat cushion may include at least one strap 40 for securing the cushion to the seat and preventing movement thereof relative to the seat. The straps may have a hook 42 or clamp for attaching to the strap to a bracket or attachment device on the seat to assist in securing the cushion to the seat.

An example seat cushion 20 may have pad portion 46 comprised of a plurality of cells 28. The cushion may have a seal 48 or be sealed along the pad portion edges. The pad portion 46 may be confined within a tray 50. The tray 50 may be configured to confine the pad and contain fluid and solids, such as food and/or drinks.

In an embodiment, the cushion and tray may be constructed of resilient material, such as plastic, rubber, etc. to facilitate conformity with the seat and the posterior of the operator.

Figure 2A:
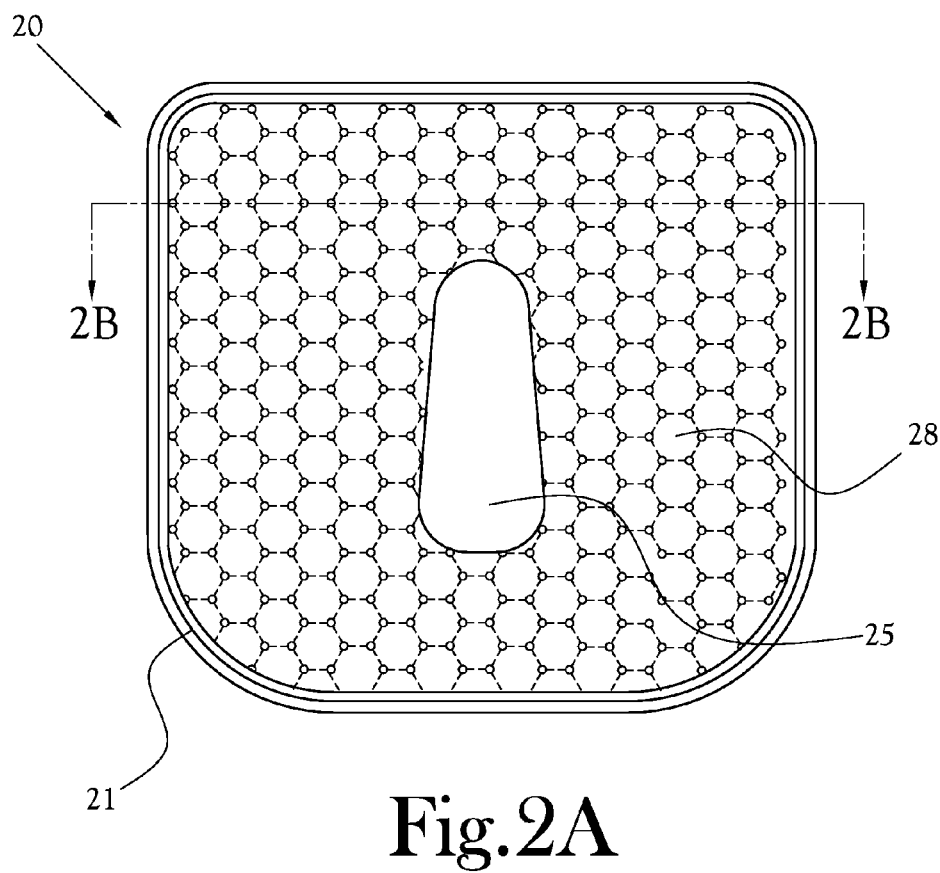
FIGS. 2A-B illustrate a top view and a cross-sectional view, taken at cut-line 2B in FIG. 2A, of the example embodiment shown in FIG. 1.
Figure 2B:
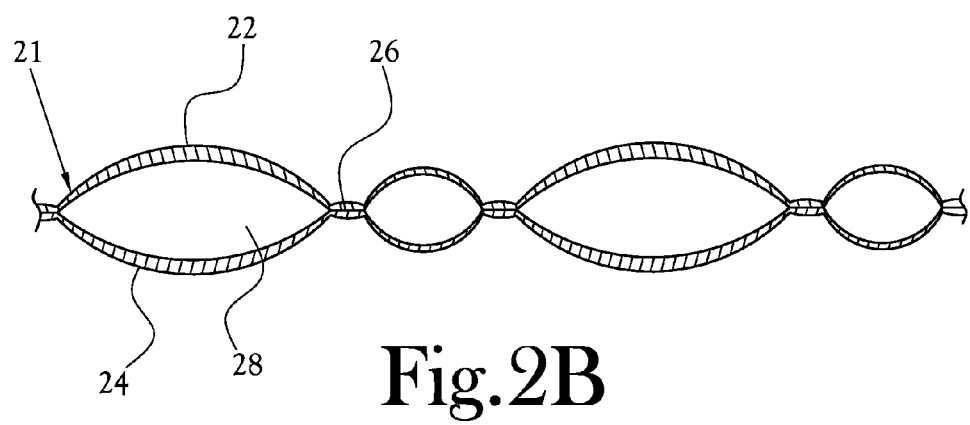

FIG. 2A illustrates a top view of an example embodiment of a seat cushion 20. FIG. 2B illustrates a portion cross-sectional view, taken along line 2B of FIG. 2A of an example embodiment seat cushion. As illustrated in FIG. 2B, the upper sheet 22 and lower sheet 24 are sealed together defining an interior volume. Furthermore, within the interior volume, the upper sheet 22 and lower sheet 24 are connected by a number of spot welds 26. Cells 28 are defined by the regions between the spot welds 26, so that the shape of each cell 28 is determined by the positioning of the spot welds 26. In the illustrated embodiment of FIG. 2A, the spot welds 26 are arranged to form hexagonal cells 28 which are in fluid communication with each other, such that the hexagonal cells 28 comprise a hexagonal tessellation. In alternate embodiments, the spot welds 26 may be arranged so that they form other cell shapes, such as substantially triangular or parallelogrammatic cells that are in fluid communication with each other.

As illustrated in FIG. 2A, the envelope 21 defines an opening 25 penetrated through the sealed upper sheet 22 and lower sheet 24, oriented near the center of the envelope 21. Referring to the illustrative example embodiment, the opening 25 of the envelope 21 defines a substantially oval shape, in which the width of opening 25 narrows slightly from the back end of the opening to the front end of the opening. In the illustrated example embodiment, the opening 25 is shaped to allow clearance for the occupant's hemorrhoids, which in one application may be the sensitive area of the occupant, but the dimension of the opening 25 is constrained so that the occupant does not lapse into the entrance of the opening 25. However, those skilled in the art will recognize other shapes and dimensions for the opening of the envelope suitable for clearance of the occupant's sensitive area are contemplated.

Figure 3:
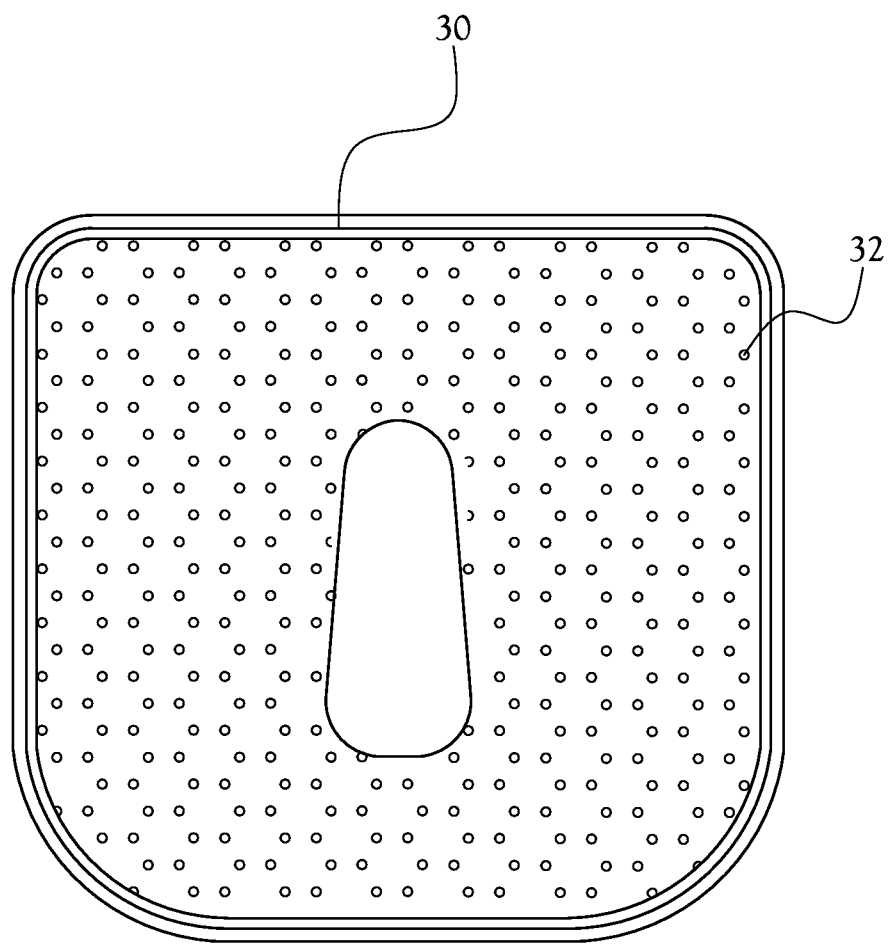
FIG. 3 illustrates a top view of an example die which may be used in the fabrication of the example embodiment sown in FIG. 1.

FIG. 3 illustrates a top view of an example mold 30 which may be used in the production of the example embodiment illustrated in FIG. 1. Referring to FIG. 3, the mold includes a plurality of pegs 32. During the production process, the pegs 32 provide the focal point where spot welds 26 are formed to couple the upper sheet 22 and lower sheet 24. In the illustrated embodiment of the mold 30, the pegs 32 are positioned and configured to form hexagonal cells 28 that are in fluid communication with each other, such that the hexagonal cells 28 comprise a hexagonal tessellation. Those skilled in the art will recognize that the pegs may be arranged to form other cellular patterns, such as substantially triangular cells, substantially square cells, or etc. that are in fluid communication with each other.

When fully assembled, the cells 28 of the envelope 21 may be filled with air, gel, fluid, or any combination thereof. In the illustrative example embodiment, the cells 28 of the envelope 21 are filled with a silicon solution, which will not freeze in most cold weather conditions. However, those skilled in the art will recognize other suitable fluids to fill the cells 28 of the envelope 21 without departing from the spirit and scope of the present general inventive concept.

In various embodiments, the upper sheet 22 and lower sheet 24 may be fabricated from a polymeric mixture. In the illustrative example embodiment, the upper sheet 22 and lower sheet 24 are fabricated from a polyurethane-based material. However, those skilled in the art will recognize other materials suitable to fabricate the upper sheet 22 and lower sheet 24 without departing from the spirit and scope of the present general inventive concept.

In an example embodiment, the seat cushion is comprised of a pressure-reduction foam made from foam rubber or a gel-infused, heat wicking foam.

In various example embodiments, the cells 28 have a height dimension that inhibits the occupant's sensitive area from contacting the seat 10. The height of each cell 28 is defined substantially by the volume of fluid dispensed into the cells 28 along with the orientation of the spot welds 26. Enlarging the diameter of each cell 28 by spacing the spot wells 26 further apart increases the cell height. Furthermore, filling the envelope 21 with more volume of fluid increases the cell height, as well. Thereby, a cell height that inhibits the occupant's sensitive area from contacting the seat 10 may be achieved by spacing the spot welds 26 further apart, dispensing more volume of fluid into the envelope 21, or any combination thereof. In the illustrative embodiment, the spot welds 26 are configured to form hexagon cells 28 with 2 inch diameters, and the envelope 21 is filled with enough fluid to produce cell heights that are proximately 0.75 inches, which allows the occupant's sensitive area to avoid contact with the seat 10. Those of skill in the art will recognize that the present general inventive concept encompasses numerous other potential sizes and dimensions that inhibit the occupant's sensitive area from contacting the seat.

Figure 4A:
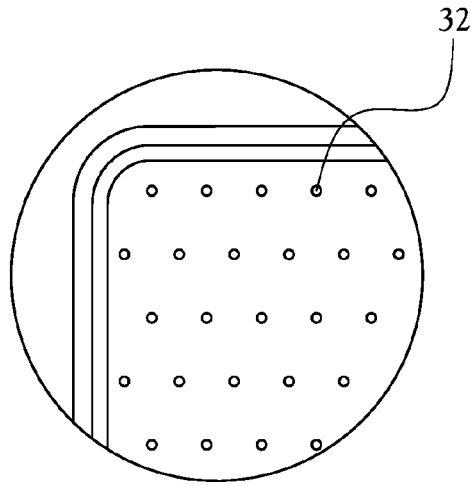
FIGS. 4A-B illustrate partial top views of an example fabrication die and resulting cell structure of the cushion.
Figure 4B:
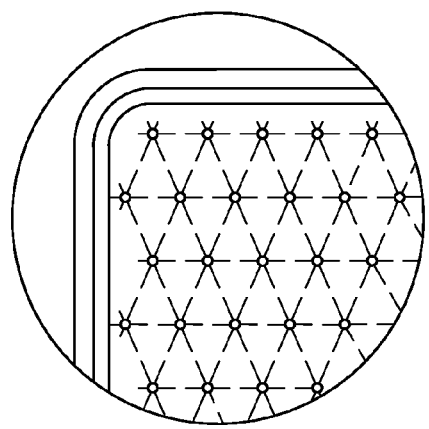

FIGS. 4A-B illustrate partial top views of an example fabrication die and resulting cell structure of a seat cushion. As illustrated in FIG. 4A, the pegs 32 are arranged so that the upper and lower sheets are coupled at points that form substantially triangular cell patterns as illustrated in FIG. 4B.

Figure 5A:
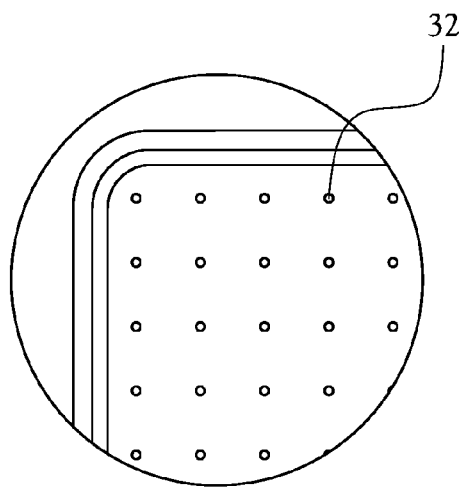
FIGS. 5A-B illustrate partial top views of an example fabrication die and resulting cell structure of the cushion.
Figure 5B:
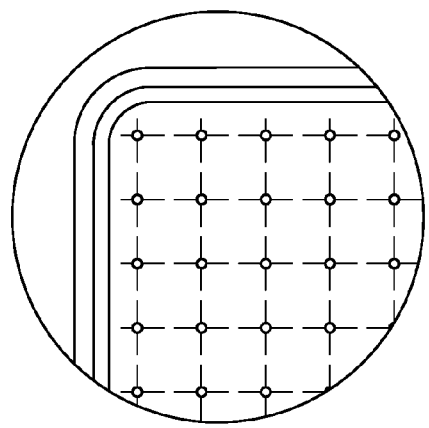

FIGS. 5A-B illustrate partial top views of an example fabrication die and resulting cell structure of a seat cushion. As illustrated in FIG. 5A, the pegs 32 are arranged so that the upper and lower sheets are coupled at points that form substantially square cell patterns as illustrated in FIG. 5B.

Figures 6A, 6B:
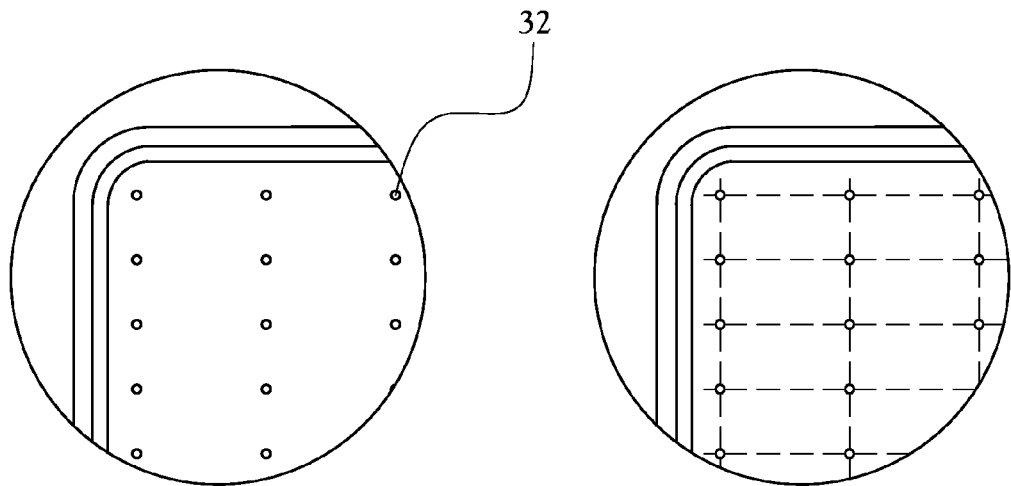
FIGS. 6A-B illustrate partial top views of an example fabrication die and resulting cell structure of the cushion.

FIGS. 6A-B illustrate partial top views of an example fabrication die and resulting cell structure of a seat cushion. As illustrated in FIG. 6A, the pegs 32 are arranged so that the upper and lower sheets are coupled at points that form substantially rectangular cell patterns as illustrated in FIG. 6B.

Figures 7A, 7B:
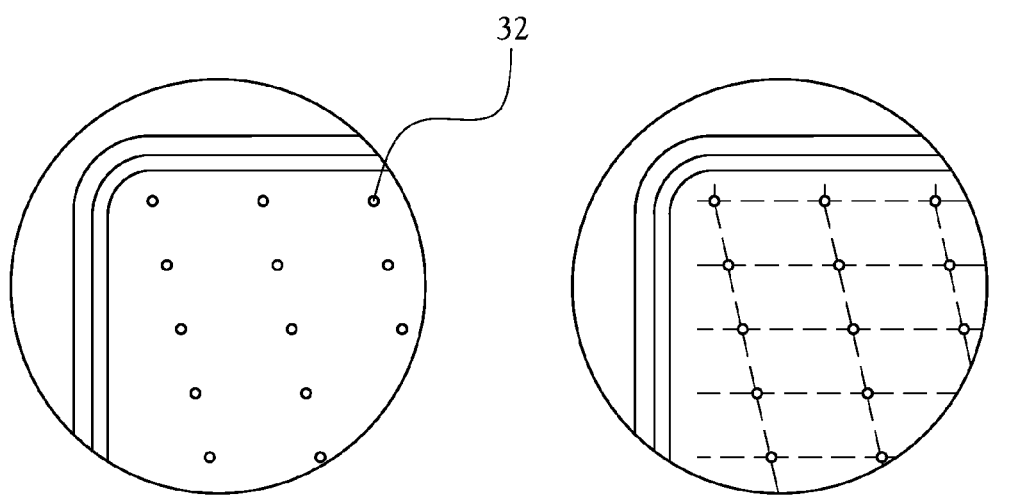
FIGS. 7A-B illustrate partial top views of an example fabrication die and resulting cell structure of the cushion.

FIGS. 7A-B illustrate partial top views of an example fabrication die and resulting cell structure of a seat cushion. As illustrated in FIG. 7A, the pegs 32 are arranged so that the upper and lower sheets are coupled at points that form substantially parallelograms cell patterns as illustrated in FIG. 7B.

It is to be noted that example embodiments of applications for the seat cushion described herein may be (but not limited to) vehicle seats, wheelchairs, office chairs, stadium chairs or bleachers and chairs or seats in general in which extended sitting is required.

An example orthopedic seat cushion for placement on a seat for supporting the weight of an occupant includes an envelope comprising an upper sheet and a lower sheet sealed together to define an interior volume, the envelope having a center. The interior volume is subdivided into a plurality of depressible cells wherein adjacent cells are in fluid communication with one another. The envelope has an opening through the upper sheet and lower sheet, wherein the opening is configured to allow clearance for a sensitive area of the occupant. The cells have a height that inhibits the sensitive area from contacting the seat when the cells are depressed by the weight of the occupant. In an example, the opening of the envelope has a substantially oval shape and the width of the opening narrows from the back end of the opening to the front end of the opening. In an example, the cells have one of the following shapes: hexagons; triangles and parallelograms. In an example, the height of at least one cell is greater than 0.5 inch. In an example, the seat cushion is configured such that not one of the cells is completely depressed by the weight of occupant. In an example, the opening is located about the center of the envelope. In an example, the cells are filled with at least one of the following: air; gel; polymeric material and fluid. In an example, the upper sheet and/or the lower sheet are comprised of at least one of the following: polyurethane and a polymeric mixture. In an example, the cells are formed by coupling the upper and lower sheet at predetermined points. In an example, the cells are formed by spot welding the upper and lower sheet at predetermined points. In an example, the upper and lower sheets do not contact. In an example, the seat cushion includes at least one strap configured to prevent movement of the seat cushion relative to the seat. These and other various geometric patterns, or any combination thereof, may be used for different functional characteristics of the seat cushion, and/or for aesthetic preferences.

While the present general inventive concept has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. An orthopedic seat cushion for placement on a seat to support the weight of an occupant comprising:
    an envelope comprising an upper sheet and a lower sheet sealed together to define an interior volume, the envelope having a center;
    wherein the interior volume is subdivided into a plurality of depressible cells wherein adjacent cells are in fluid communication with one another;
    the envelope having an opening penetrated through the upper sheet and lower sheet, wherein the opening has a front end and a back end and is configured to allow clearance for a sensitive area of the occupant;
    wherein at least one cell has a height dimension that inhibits the sensitive area from contacting the seat when the at least one cell is depressed by the weight of the occupant; and
    a tray surrounding an underside of the lower sheet and outer edges of the upper sheet and the lower sheet, the tray having an open top for receiving and presenting the envelope for engagement by the occupant, the seat cushion comprising at least one strap coupled directly to the tray for securing the seat cushion to the seat.

2. The seat cushion of claim 1, wherein the opening of the envelope has a substantially oval shape and wherein the width of the opening narrows from the back end of the opening to the front end of the opening.

3. The seat cushion of claim 1, wherein the at least one cell is shaped substantially as at least one of the following shapes: hexagons; triangles and parallelograms.

4. The seat cushion of claim 1, wherein the height of the at least one cell is greater than 0.5 inch.

5. The seat cushion of claim 1, wherein the seat cushion is configured such that not one of the plurality of cells is completely depressed by the weight of occupant.

6. The seat cushion of claim 1, wherein the opening is located about the center of the envelope.

7. The seat cushion of claim 1, wherein the plurality of cells are filled with at least one of the following: air; gel; polymeric material and fluid.

8. The seat cushion of claim 1, wherein the upper sheet and/or the lower sheet are comprised of at least one of the following: polyurethane and a polymeric mixture.

9. The seat cushion of claim 1, wherein the cells are formed by coupling the upper and lower sheet at predetermined points.

10. The seat cushion of claim 1, wherein the cells are formed by spot welding the upper and lower sheet at predetermined points.

11. The seat cushion of claim 1, wherein the upper and lower sheets contact each other only along edges of the sheets.

12. The seat cushion of claim 1, further comprising the at least one strap configured to prevent movement of the seat cushion relative to the seat.

13. An orthopedic seat cushion for placement on a seat to support the weight of an occupant comprising:
   an envelope comprising an upper sheet and a lower sheet sealed together to define an interior volume, the envelope having a center;
   wherein the interior volume is subdivided into a plurality of depressible cells wherein adjacent cells are in fluid communication with one another and further wherein the cells are formed by coupling the upper and lower sheet at predetermined points;
   the envelope having an opening penetrated through the upper sheet and lower sheet, wherein the opening is located proximate the center of the envelope and has a substantially oval shape and has a front end and a back end and is configured to allow clearance for a sensitive area of the occupant;
   wherein at least one cell has a height dimension that inhibits the sensitive area from contacting the seat when the at least one cell is depressed by the weight of the occupant; and
   a tray surrounding an underside of the lower sheet and outer edges of the upper sheet and the lower sheet, the tray having an open top for receiving and presenting the envelope for engagement by the occupant, the seat cushion comprising at least one strap coupled directly to the tray for securing the seat cushion to the seat.

14. The seat cushion of claim 13, wherein the width of the opening narrows from the back end of the opening to the front end of the opening.

15. The seat cushion of claim 13, wherein the at least one cell is shaped substantially as at least one of the following shapes: hexagons; triangles and parallelograms.

16. The seat cushion of claim 13, wherein the height of the at least one cell is greater than 0.5 inch.

17. The seat cushion of claim 13, wherein the plurality of cells are filled with at least one of the following: air; gel; polymeric material and fluid.

18. The seat cushion of claim 13, wherein the upper sheet and/or the lower sheet are comprised of at least one of the following: polyurethane and a polymeric mixture.

19. The seat cushion of claim 13, wherein the cells are formed by spot welding the upper and lower sheet at predetermined points.

20. The seat cushion of claim 13, further comprising the at least one strap configured to prevent movement of the seat cushion relative to the seat.

* * * * *